United States Patent Office 3,295,947
Patented Jan. 3, 1967

3,295,947
HERBICIDAL MIXTURE COMPRISING AN S-TRI-AZINE DERIVATIVE AND N-(B-O,O-Di-ISOPRO-PYLDITHIOPHOSPHORYLETHYL) BENZENE-SULFONAMIDE
Jitsuichi Kishikawa and Shoichi Yokoyama, Osaka, Japan, assignors to Stauffer Chemical Company, New York, N.Y., a corporation of Delaware
No Drawing. Filed Apr. 21, 1964, Ser. No. 361,574
Claims priority, application Japan, Nov. 26, 1963, 38/63,006, 38/20,784
14 Claims. (Cl. 71—2.5)

This invention relates to certain novel compositions of matter and the use of such compositions as herbicides. More particularly, it has been found that certain S-triazine derivatives, when mixed with a N-($\beta$-O,O-di-iso-propyldithiophosphorylethyl) - benzenesulfonamide, exhibit unexpecedly synergistic herbicidal properties and are particularly useful for controlling or killing grassy weeds. This invention also relates to a method for preparing such herbicidal compositions.

Novel herbicidal compositions according to the present invention comprise, in general, one part by weight of compounds of the general formula:

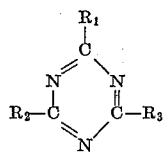

wherein $R_1$ represents a halogen, methoxy or methylthio radical, and $R_2$ and $R_3$ represent ethylamino, isopropylamino, diethylamino or allylamino radicals, and 1 to 20 parts by weight of N-($\beta$-O,O-di-iso-propyldithiophosphorylethyl)benzensulfonamide.

Today, the methods most commonly employed for controlling or killing weeds in paddy fields are classified into two groups: killing of broadleaf weeds with a series of derivatives of phenoxyacetic such as 2,4–D and MCP, and inhibition of the growth of grass weeds with PCP. In practice, weeding is carried out in paddy fields with suitable combinations of these two methods.

However, PCP and its analogues compounds have so many disadvantages as below mentioned in the use for extermination of grass weeds, that their applications are extremely limited, and therefore, new herbicides easy to handle have ardently been desired not only by farmers but by those in the trade. First and most important, such conventional drugs are deadly poisonous for fish, and hence their use has to be either prohibited or restricted even in areas considerably remote from fishing grounds. Second, prevention of the growth of grass weeds with PCP-Na and its analogous compounds is carried out through germination control and therefore, the method is applicable to a certain limited period of the season, and, otherwise, the drugs take no effect. When applied rather carelessly, they may prove noxious to rice plants, because they are non-selective herbicides. Third, the drugs are far more stimulative to human skins than other ordinary argicultural drugs. Although various forms of preparations have been envisaged or proposed so far in order to mitigate the stimulative effects, nothing fully satisfactory has been perfected up to now.

In areas where the fields for grasses occupy the majority of cultivated lands, the most rampant of the grass weeds in summer are: Polish millet (Digitaria ciliaris Pers); and wild oats (Avena fatua L.) in plantations; Cocks-foot (Pancium Crus-galli L.) in paddy fields; and Dent foxtail (Alopeculus aequalis Sobol) in paddy fields where plants other than rice are cultivated as second crops. These weeds cannot be killed by phenoxyacetic acid preparations, while PCP has disadvantages as described hereinabove in eradicating weeds out of paddy fields, and extensive use of PCP is considered difficult for this reason.

In plantations and paddy fields where plants other than rice are cultivated as second crops, such herbicides as Chloro-IPC, PCP, DCMU, DPA, and CAT have hirtherto been used. These preparations invariably have defects in that they are subjected to various restrictions in use, because they have substantial adverse effects upon the crops, and may prove poisonous unless full and constant considerations are given to the timing of use, thickness of the covering earth layer, rainfalls, type of soil, and many other factors.

In quest for the way of correcting the above defects by mixing new preparations having far less toxicity upon crops than that of the aforementioned drugs, we have found that the CAT derivatives of the general formula given above, when mixed with N-($\beta$-O,O—di-iso - propyldithiophosphorylethyl)benzenesulfonamide, have unexpected synergistic effects, as illustrated in the examples given later.

The compounds represented by the above general formula include:

(1) 2-methylmecapto-4,6-bis(isopropylamino)-S-triazine
(2) 2-methylmercapto-4,6-bis(ethylamino)-S-triazine
(3) 2-methylmercapto-4-isopropylamino - 6-ethylamino-S-triazine
(4) 2-chloro-4,6-bis(ethylamino)-S-triazine
(5) 2-chloro-4,6-bis(isopropylamino)-S-triazine
(6) 2-chloro-4-isopropylamino-6-ethylamino-S-triazine
(7) 2-chloro-4,6-bis(diethylamino)-S-triazine
(8) 2-chloro-4,6-bis(allylamino)-S-triazine
(9) 2-methoxy-4,6-bis(ethylamino)-S-triazine
(10) 2-methoxy-4,6-bis(isopropylamino)-S-triazine
(11) 2-methoxy - 4 - isopropylamino - 6 - ethylamino-S-triazine Now to describe the present invention further in detail, we have found that N-($\beta$-O,O-di-iso-propyldithiophosphorylethyl)benzenesulfonamide, when applied in an amount of from about 20 to 100 grams per are (100 m.$^2$) of field, has no adverse effect upon useful grassy plants such as rice and wheat but has deadly poisonous effects on grassy weeds which grow thereamong. To be more exact, the above composition has uniquely selective herbicidal effects as it is greatly herbicidal against Polish millet (Digitaria ciliaris Pers), Japanese millet (Echinochloa crus-galli L.), Cocks-foot (Panicum crus-galli L.), Dent foxtail (Alopeculus aequalis Sobol), bird grass (Pao annua L.) and other grassy weeds, whereas it in no way affects useful grassy plants, particularly rice and wheat, even in direct contact with the plants or with their seeds through earth, when applied in concentrations for practical use, or even in concentrations a few times higher than the normal values. On the other hand, the compounds represented by the general formula given above have difficulties in preventing the growth of grassy weeds, in sustaining the effects satisfactorily, and in precluding the danger of exerting poisonous effects upon crops when applied in amounts enough to display full effects against the weeds. This more than offsets the advantage of those compounds when they are widely applied in amounts ranging from 2 to 15 grams per are of field, with particularly good effects on annular weeds.

These compounds, however, if used in mixture with N-($\beta$ - O,O - di - iso - propyldithiophosphorylethyl)benzenesulfonamide, can attain much better herbicidal effects, have wider applicable ranges, and sustain the effects much longer than when used each separately and individually, even in mixtures wherein the concentrations of the respective components are less than those for practical use of the individual compounds. Thus, the numerous difficulties encountered with said compounds when applied individually can be overcome. In other words, the compositions according to the invention comprise smaller amounts of the compounds of the general formula given above than the amounts of the compounds applied individually, whereby they can achieve herbicidal effects in cost-saving and perfect manner without having any adverse effect on crops.

For field use, the compositions of the invention can be prepared to various forms by the conventional methods employed in the art. For example, they may take the form of powder, granules, aqueous solutions, emulsions or the like with the addition or by the use of solvents, carriers, and assistants. Or, they may be applied as preparations in mixture with other agricultural drugs, fertilizers and so forth. It is particularly effective to use the compositions of the invention in the form of preparations blended with α-BHC, Diazinon, Dipterex, Bayzid and other insecticides, thereby to acquire combined effects.

The herbicidal compositions according to the present invention are extensively applicable for herbicidal purposes regardless of the form of preparations, means of application, time of application and other factors. They are particularly effective when used for treatment of soil, water surface, and ground surface during the germination period or at the beginning of germination of weeds. Although the suitable amounts of the compositions for application depend on the type of weeds, forms of preparation, means and time of application and other determinants, a rule of thumb in the case of water-surface or ground-surface treatment may be such that a suitable amount of the effective components is 20 to 150 grams per are of the fields.

Now the compositions of the invention are illustrated by some examples, in which the amounts are given all by weight of the total compositions.

Example 1

Seven parts of N-(β-O,O-di-iso-propyldithiophosphorylethyl)benzenesulfonamide, one part of 2-methylmercapto-4,6-bis-isopropylamino)-s-triazine, 70 parts of clay, 20 parts of urea, and two parts of calcium salt of ligninsulfonic acid were mixed and ground altogether, and kneaded thoroughly with the addition of 20 parts of water. The mixture was then granulated to a grain size of 10 to 40 meshes by a granulator, and, upon drying, formed a granular preparation.

Example 2

10 parts of N-(β-O,O-di-iso-propyldithiophosphorylethyl)benzenesulfonamide, one part of 2-chloro-4,6-bis-(ethylamino)-s-triazine, 70 parts of a mixture of talc and clay, 17 parts of urea, and two parts of calcium salt of dodecylbenzenesulfonic acid were mixed and ground altogether, and kneaded thoroughly with the addition of water. The mixture was then granulated by a granulator, and dried to form a granular preparation.

Example 3

40 parts of N-(β-O,O-di-iso-propyldithiophosphorylethyl)benzenesulfonamide, four parts of 2-methylmercapto-4,6-bis(isopropylamino)-s-triazine, 54 parts of diatomaceous earth, and two parts of polyoxyethylene alkylphenol ether were mixed and ground altogether, and wettable powder preparation was formed.

Example 4

Two parts of N-(β-O,O-di-iso-propyldithiophosphorylethyl)benzenesulfonamide, 0.15 part of 2-methylmercapto-4,6-bis(isopropylamino)-s-triazine, and 97.95 parts of a mixture of talc and clay were mixed and pulverized to form a powdery preparation.

Example 5

To a mixture of 15 parts of N-(β-O,O-di-iso-propyldithiophosphorylethyl)benzenesulfonamide, 1.5 parts of 2-methylmercapto - 4,6 - bis(isopropylamino) - s - triazine, 34.0 parts of 10–20μ BHC powder (4 parts of γ-BHC), 47.5 parts of talc, and 2.0 parts of dianthrathenylmethane disulfonate-NH₄ salt, 25 parts of water was added, and the whole was mixed and kneaded thoroughly, and then granulated to a grain size of 20 to 40 meshes. Upon drying, a granular preparation was formed.

The results of some tests conducted are given hereunder as proofs of the effectiveness of the compositions of the invention.

Test 1.—Test on effects in fields

Test method: Wooden boxes, each 30 x 30 x 30 cm., were packed with earth. Predetermined amounts of the compositions (granular preparations) according to the invention were sprinkled over the earth surface, immediately followed by sowing of the seeds of weeds, i.e. Polish millet (*Digitaria ciliaris* Pers), Japanese millet (*Echinochloa crus-galli* L.), curled dock (*Rumex acetosa* L.), and pig weed (*Amaranthus blituni* L.). This sown surface was covered with a thin layer of earth, 5 mm. in thickness. After three weeks, the weeds grown were weighed, and the weight percentages of the treated weeds were found on the basis of an untreated reference.

Test results:

TABLE 1

| Sample No. | Dose per are of field (g.) | | Weight percentage of live weeds | | | |
|---|---|---|---|---|---|---|
| | N-(β-O,O-di-iso-propyldithio-phosphorylethyl)benzenesulfonamide | 2-methylmercapto-4,6-bis(isopropylamino)-s-triazine | Polish millet | Japanese millet | Curled dock | Pig weed |
| 1 | 60 | 0 | 3.4 | 9.5 | 77.7 | 80.3 |
| 2 | 30 | 0 | 7.1 | 23.9 | 88.9 | 92.1 |
| 3 | 0 | 8 | 3.9 | 22.1 | 2.1 | 1.1 |
| 4 | 0 | 4 | 11.5 | 40.7 | 10.1 | 11.2 |
| 5 | 20 | 3 | 0.4 | 10.4 | 3.6 | 7.1 |
| 6 | 30 | 3 | 0.3 | 2.0 | 2.6 | 5.8 |
| 7 | 40 | 4 | 0.0 | 1.7 | 2.1 | 3.1 |
| 8 | 3-(3,4-dichlorophenyl)-1,1-dimethyl urea | | 28.3 | 32.1 | 17.2 | 18.3 |
| 9 | Non-treated | | 100 | 100 | 100 | 100 |

Test 2.—Results of tests in paddy fields

Test method: Paddy fields sown uniformly with seeds of weeds, i.e. *Dopatorium junceum* Hamilt, ponterderiaceae (*Monochoria vaginealis* Presl), *Rotala indica* Koehne, smart weed (*Elatine orientalis* Makino), Cocksfoot (*Panicum crus-galli* L.), and pig weed (*Amaranthus blitune* L.), were partitioned by levees into areas each 4m. x 5m. Rice was transplanted on these test areas. Ten days later, the water surface of the test areas, submerged in water about 3 cm. deep, was treated with the compositions (in granular preparations) according to the invention. One month after the treatment, the weeds grown were eradicated, and millets were sorted from broadleaf weeds, and their live bodies were weighed respectively. In order to determine the residual effects of the compositions, 1/4000- are Wagner pots were filled with dilurial soil, which was allowed to absorb water up to its saturated water capacity. Then, the soil was sown with the seeds of Japanese millet 0, 5, 10, 15 days and so forth after the treatment with the compositions (granular preparations) according to the invention. Thereafter the growth rates were determined in terms of the weights of the live weeds grown.

Test results:

TABLE 2

| Test area | Dose (effective ingredient) per are of paddy field (g.) | | Percentage by wt. of weeds | | Residual effect test |
|---|---|---|---|---|---|
| | N-(β-O,O-di-iso-propyldithio-phosphorylethyl) benzenesulfonamide | 2-methylmercapto-4,6-bis(isopropylamino)-s-triazine | Millets | Broadleaf weeds | No. of days required for percentage by weight of millets to exceed 20% |
| 1 | 60 | 0 | 5.0 | 77.3 | 60 |
| 2 | 30 | 0 | 8.0 | 83.2 | 45 |
| 3 | 0 | 2 | 10.4 | 5.9 | 30 |
| 4 | 0 | 4 | 11.3 | 7.6 | 20 |
| 5 | 50 | 3 | 0.0 | 2.1 | 75 |
| 6 | 40 | 4 | 0.6 | 3.2 | 70 |
| 7 | 30 | 3 | 0.0 | 4.0 | 60 |
| 8 | Treated with 300 g. of Pamcon (POP-Na+MCP-ethyl) granular prep. | | 21.6 | 3.3 | 35 |
| 9 | Non-treated | | 100 | 100 | 0 |

The compositions of the invention applied to the test areas 5 through 7 in Table 2 exerted no poisonous effect when the doses of individual ingredients were halved, and proved highly effective for millets and broadleaf weeds. They displayed great herbicidal effects on those weeds which the individual compounds applied separately could hardly kill. Also, the compositions of the invention, when applied seven to ten days after young rice plants have been transplaned into the paddy fields, sustained the herbicidal effects to such extents that the treatment of the fields with MCP or 2,4–D usually in practice after one or two rounds of intermediate tilling, becomes unnecessary.

The examples are given above solely to illustrate the present invention and therefore, it is understood that the invention is not limited thereto whatsoever as various modifications of the invention will readily occur to those skilled in the art, and the invention is to be given its broadest possible interpretation within the terms of the following claims.

We claim:

1. Herbicidal compositions comprising a herbicidally effective amount of a mixture of (a) one part by weight of a compound of the formula:

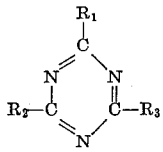

wherein $R_1$ is selected from the group consisting of halogen, methoxy and methylthio radicals, and $R_2$ and $R_3$ are selected from the group consisting of ethylamino, isopropylamino, diethylamino or allylamino radicals, and (b) 1 to 20 parts by weight of N-(β-O,O-di-iso-propyldithiophosphorylethyl)benzenesulfonamide.

2. Herbicical compositions according to claim 1 wherein said compound is 2-methylmercapto-4,6-bis(isopropylamino)-S-triazine.

3. Herbicidal compositions according to claim 1 wherein said compound is 2-methylmercapto-4,6-bis(ethylamino)-S-triazine.

4. Herbicidal compositions according to claim 1 wherein said compound is 2-methylmercapto-4-isopropylamino-6-ethylamino-S-triazine.

5. Herbicidal compositions according to claim 1 wherein said compound is 2-chloro-4,6-bis(ethylamino)-S-triazine.

6. Herbicidal compositions according to claim 1 wherein said compound is 2-chloro-4,6-bis(isopropylamino)-S-triazine.

7. Herbicidal compositions according to claim 1 wherein said compound is 2-chloro-4-isopropylamino-6-ethylamino-S-triazine.

8. Herbicidal compositions according to claim 1 wherein said compound is 2-chloro-4,6-bis(diethylamino)-S-triazine.

9. Herbicidal compositions according to claim 1 wherein said compound is 2-chloro-4,6-bis(allylamino)-S-triazine.

10. Herbicidal compositions according to claim 1 wherein said compound is 2-methoxy-4,6-bis(ethylamino)-S-triazine.

11. Herbicidal compositions according to claim 1 wherein said compound is 2-methoxy-4,6-bis(isopropylamino)-S-triazine.

12. Herbicidal compositions according to claim 1 wherein said compound is 2-methoxy-4-isopropylamino-6-ethylamino-S-triazine.

13. A method for the control of weeds which comprises applying to a locus to be protected a phytotoxic and herbicidally effective amount of a herbicidal composition containing (a) one part by weight of a compound of the formula:

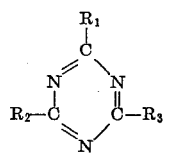

wherein $R_1$ is selected from the group consisting of halogen, methoxy and methylthio radicals, and $R_2$ and $R_3$ are selected from the group consisting of ethylamino, isopropylamino, diethylamino or allylamino radicals, and (b) 1 to 20 parts by weight of N-($\beta$-O,O-di-iso-propyldithiophosphorylethyl)benzenesulfonamide.

14. A method according to claim 13 wherein said compound is 2-methylmercapto-4,6-bis(isopropylamino)-S-triazine.

References Cited by the Examiner
UNITED STATES PATENTS

| | | | |
|---|---|---|---|
| 3,022,150 | 2/1962 | Weed | 71—2.5 |
| 3,037,853 | 6/1962 | Luckenbaugh | 71—2.5 |
| 3,205,253 | 9/1965 | Fancher et al. | 71—2.6 X |

LEWIS GOTTS, *Primary Examiner.*

JAMES O. THOMAS, *Examiner.*

UNITED STATES PATENT OFFICE
CERTIFICATE OF CORRECTION

Patent No. 3,295,947 January 3, 1967

Jitsuichi Kishikawa et al.

It is hereby certified that error appears in the above numbered patent requiring correction and that the said Letters Patent should read as corrected below.

In the heading to the printed specification, line 10, after "Japan," insert -- Apr. 23, 1963, 38/2074; --; line 11, strike out ",38/20,784".

Signed and sealed this 26th day of September 1967.

(SEAL)
Attest:

ERNEST W. SWIDER
Attesting Officer

EDWARD J. BRENNER
Commissioner of Patents